United States Patent
Kuan et al.

(10) Patent No.: US 7,751,096 B2
(45) Date of Patent: Jul. 6, 2010

(54) SCANNING DEVICE HAVING REDUCED SCANNING TIMES AND METHOD RELATED THERETO

(76) Inventors: Chien-Kuo Kuan, 5F, No. 18-1, Lane 214, Sec. 4, Chung-Shin Rd., San-Chung City, Taipei Hsien (TW); Yu-Chen Liu, No. 68, Lane 39, Jungsan St., Shi-Jr City, Taipei Hsien (TW); Shih-Yin Chen, 4F-2, No. 11, Lane 125, Si-Zang Rd., Taipei (TW)

( * ) Notice: Subject to any disclaimer, the term of this patent is extended or adjusted under 35 U.S.C. 154(b) by 2009 days.

(21) Appl. No.: 10/604,790

(22) Filed: Aug. 17, 2003

(65) Prior Publication Data

US 2004/0233482 A1    Nov. 25, 2004

(30) Foreign Application Priority Data

May 21, 2003    (CN) ................................ 03 1 36715

(51) Int. Cl.
*H04N 1/04* (2006.01)

(52) U.S. Cl. ................... 358/475; 358/474; 358/497

(58) Field of Classification Search ................ 358/475, 358/509, 483, 482, 474, 497, 496, 487, 505, 358/506, 512–514; 250/578.1, 208.1, 234–236; 362/611–614; 399/51, 220, 211, 212; 355/20, 355/40, 41; 382/312, 318, 319
See application file for complete search history.

(56) References Cited

U.S. PATENT DOCUMENTS

| 4,926,253 | A  | * | 5/1990 | Nakashima et al. | ......... 358/515 |
|---|---|---|---|---|---|
| 6,104,510 | A  | * | 8/2000 | Hu et al. | ..................... 358/509 |
| 7,079,791 | B2 | * | 7/2006 | Chang et al. | ................ 399/220 |
| 2002/0008850 | A1 | * | 1/2002 | Noji et al. | ..................... 353/30 |
| 2005/0041269 | A1 | * | 2/2005 | Tsuboi | ....................... 358/474 |
| 2007/0097386 | A1 | * | 5/2007 | Tregoning et al. | ............ 358/1.6 |

FOREIGN PATENT DOCUMENTS

| JP | 02107055 A | * | 4/1990 |
|---|---|---|---|
| JP | 03182157 A | * | 8/1991 |

* cited by examiner

*Primary Examiner*—Cheukfan Lee
(74) *Attorney, Agent, or Firm*—Workman Nydegger

(57) ABSTRACT

A scanning device includes a housing, a cold cathode fluorescent lamp (CCFL), and a light emitting diode (LED), a photosensor for detecting light that is emitted from the CCFL and the LED and then by way of a document, and a control circuit for controlling operations of the scanning device. The LED can be used to perform scans while the CCFL is heating.

24 Claims, 8 Drawing Sheets

SCANNING DEVICE HAVING REDUCED SCANNING TIMES AND METHOD RELATED THERETO

BACKGROUND OF INVENTION

1. Field of the Invention

The present invention relates to a scanning device, and more particularly, to a scanning device capable of reducing document scanning times.

2. Description of the Prior Art

Scanning devices, such as fax machines, scanners, copiers, or multi-function products with integrated print, scan and faxing functions, are popular electronics devices. These devices have a scanning device for obtaining a corresponding image from a document.

Please refer to FIG. 1, which is a block diagram of a conventional scanning device 10 according to the prior art. The scanning device 10 comprises a cover 11, a housing 12, a cold cathode fluorescent lamp (CCFL) 14, a photosensor 16 and a controller 18. The CCFL 14 is used for producing light. The photosensor 16, which can be a Charge-Coupled Device (CCD), is used for detecting light produced by the CCFL 14 that reflects off of a document 15. The controller 18 is used for controlling internal operations of the scanning device 10.

The basics of the scanning device 10 are described as follows. First, the desired document 15 is placed onto the scanning device 10 and the cover 11 is closed, which prevents ambient light from influencing the scanning process. Then, the CCFL 14 generates light to illuminate the document 15, and the photosensor 16 detects the reflected light from the document 15. Since less light is capable of being reflected from dark areas of the document 15, while more light is reflected from the bright areas of the document 15, the photosensor 16 is able to detect the corresponding intensity variations of the reflected light. Finally, the controller 18 transforms the detected intensity patterns of the reflected light into digital data, and combines these digital data into an image file.

Please refer to FIG. 2 in conjunction to FIG. 1. FIG. 2 illustrates a relationship between intensity variations of the cold cathode fluorescent lamp versus time during a warm-up time period. Color image information is obtained by using the CCFL 14 of the scanning device 10 to scan a single time, and this is possible when a sufficiently stable and bright light is produced by the CCFL 14. To do so, the CCFL 14 must reach a sufficiently high temperature to excite enough ions to strike the fluorescent material disposed on the glass tube of the CCFL 14. In general, the period required to heat the CCFL 14 to the appropriately high temperature is called the warm-up time period. A so-called warm-up time period($t_0$-$t_1$), with values of 45 to 90 seconds, is typically required. During the warm-up time period, a substantial luminance variation of the light provided by the CCFL 14 is exhibited. If the luminance variation is too great, corresponding errors for the reflected light detected by the photosensor 16 are created. From FIG. 2, the luminance variation of the light provided by the CCFL 14 in the period between $t_0$-$t_1$ is too great to permit color scans. As an example, during the period of $t_a$~$t_b$ as illustrated in FIG. 2, when using the CCFL 14 to scan the area 17 of the document 15 having a uniform gray level, ideally the photosensor 16 should detect the same reflected light luminance. However, because the luminance of the light provided by the CCFL 14 at the time $t_b$ is larger than that at the time $t_a$, the photosensor 16 detects a different luminance for the same gray-level area 17, causing the controller 18 to read error-laden data, which leads to incorrect image data. Hence, the CCFL 14 of the conventional scanning device 10 requires a relatively long warm-up time for generating a sufficiently stable and bright light to ensure a high quality scan.

To reduce scanning times while maintaining high quality scans, the scanning device 10 may be provided more than one CCFL 14. In this way, higher light intensities are available, but the warm-up time period remains unchanged. This is a waste of time for the user.

SUMMARY OF INVENTION

It is therefore a primary objective of the claimed invention to provide a scanning device for reducing scanning times and for providing scanning during the warm-up time period to solve the above-mentioned problems.

Briefly summarized, the claimed invention provides a scanning device having a housing, a $_{13}$ cold cathode fluorescent lamp (CCFL), and a light emitting diode (LED), both for emitting light, a photosensor for detecting light that is emitted from the CCFL and the LED, and which is then reflected from a document, and a control circuit for controlling operations of the scanning device.

It is an advantage of the present invention that the LED may be used to perform scanning while the CCFL is being heated, thereby eliminating the need of the user to wait upon the warm-up time of the CCFL.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
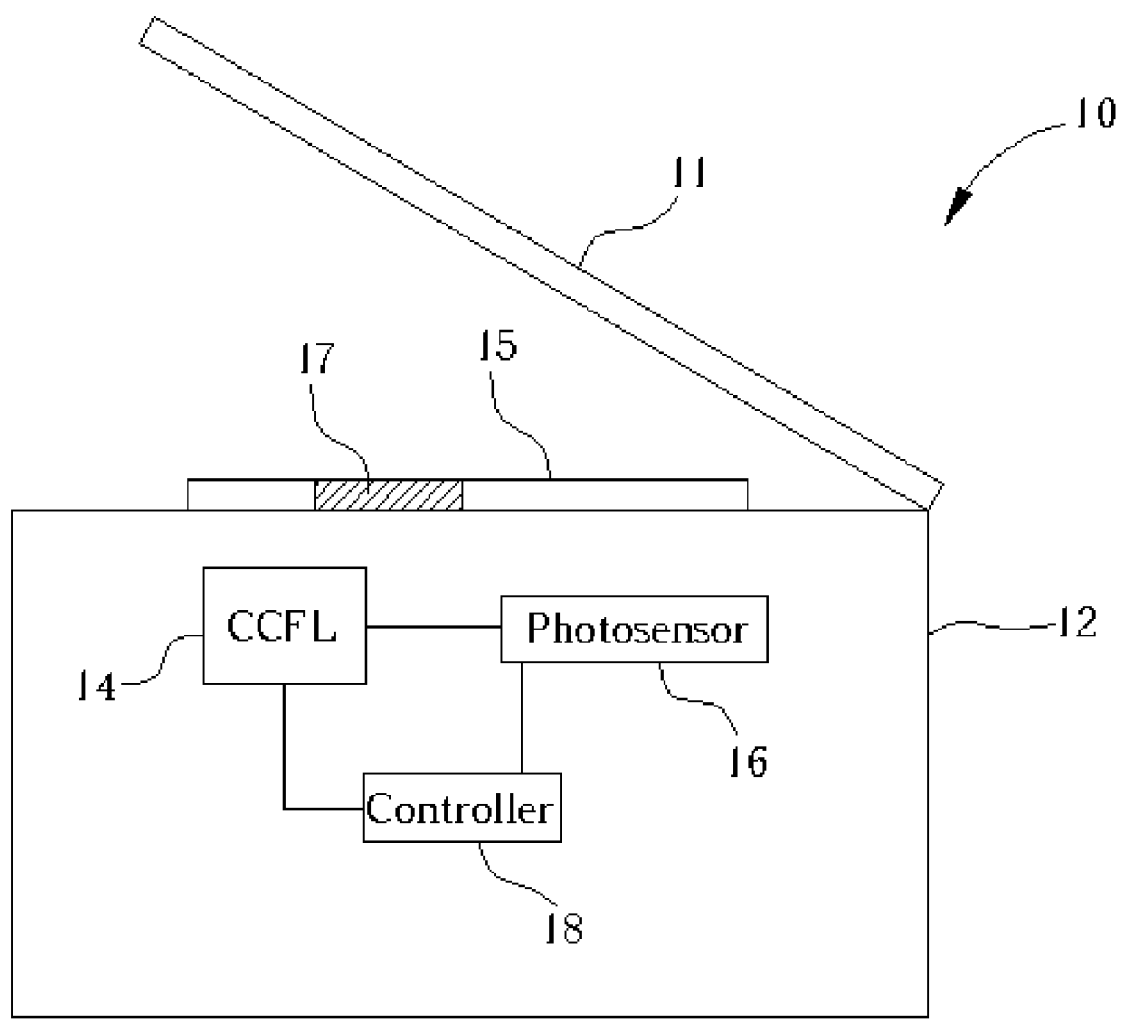
FIG. 1 is a block diagram of a conventional scanning device according to the prior art.
Figure 2:
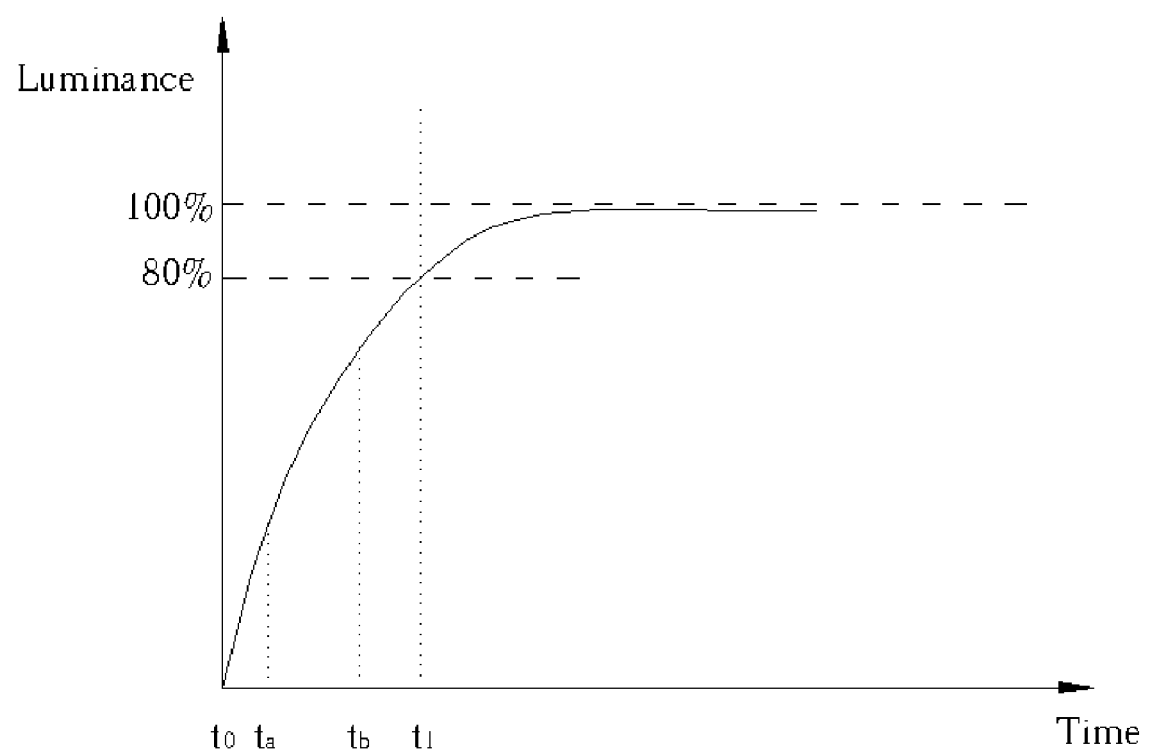
FIG. 2 illustrates a relationship between luminance variations of a cold cathode fluorescent lamp depicted in FIG. 1 versus time.
Figure 3:
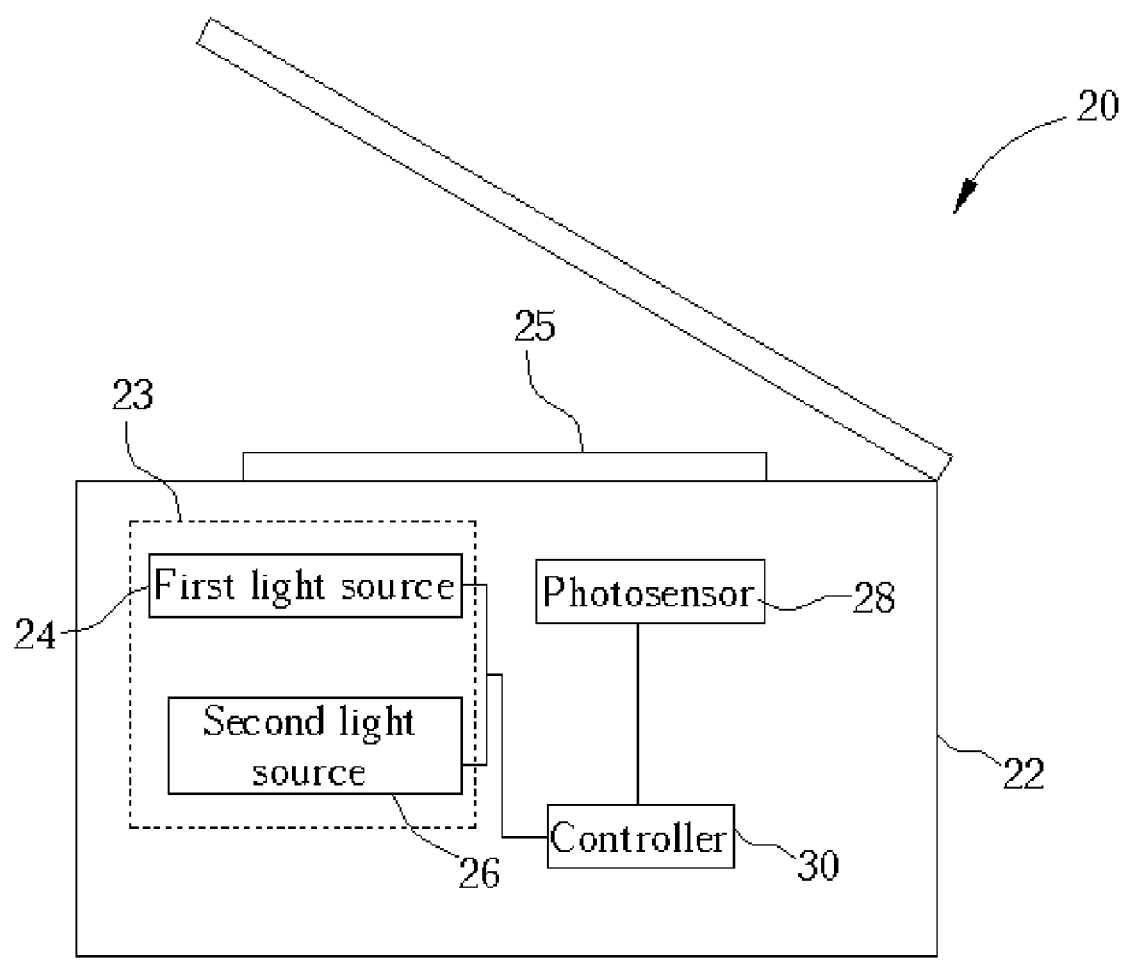
FIG. 3 shows a block diagram of a scanning device according to the present invention.

Please refer to FIG. 3, which shows a block diagram of a scanning device 20 according to the present invention. The scanning device 20 comprises a housing 22, a scanning module 23, a photosensor 28, and a controller 30. The scanning module 23 comprises a first light source 24 and a second light source 26, both of which are used to produce light to illuminate a document 25. The photosensor 28 is used for detecting light generated by both the first light source 24 and the second light source 26 that is reflected from the document 25. The controller 30 is used for controlling operations of the scanning device 20. The warm-up time period of the first light source 24 is longer than that of the second light source 26. The first light source 24 can be a cold cathode fluorescent lamp (CCFL). The second light source 26 can be a white-light light emitting diode (LED). The photosensor 28 can be a charge coupled device (CCD).

Figure 4:
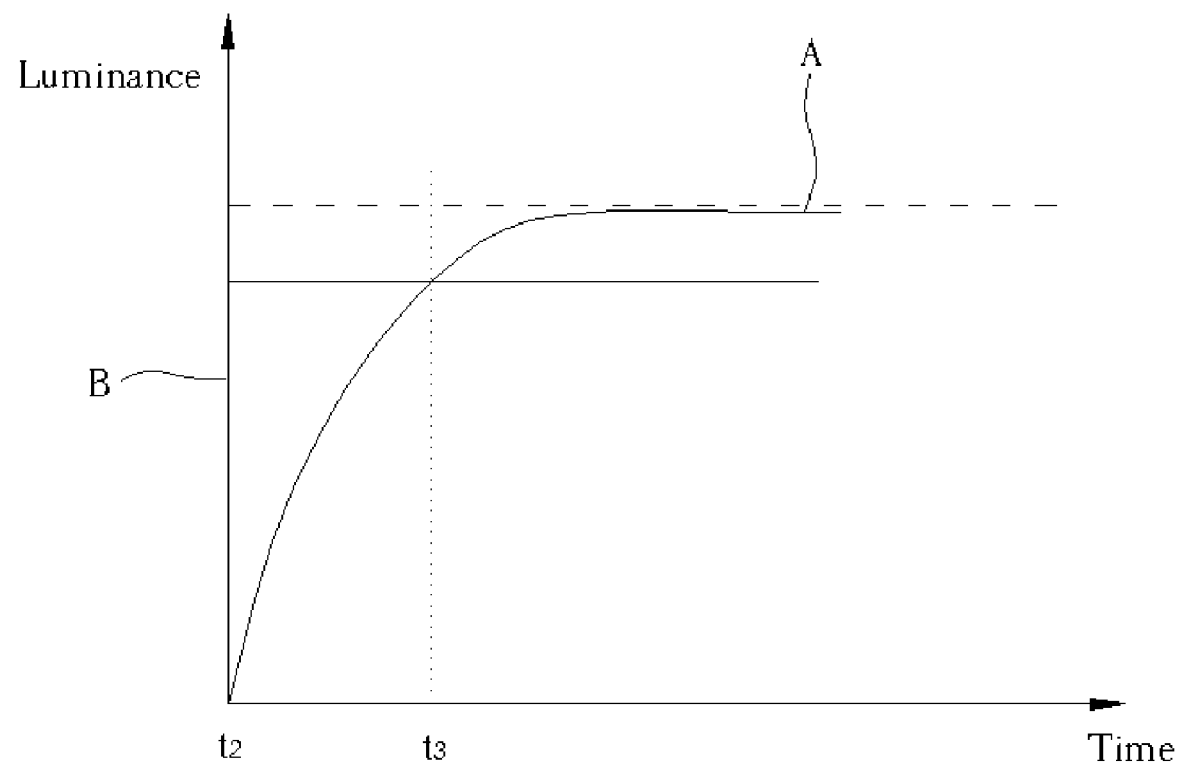
FIG. 4 illustrates a relationship among luminance variations of a first light source and a second light source depicted in FIG. 3 versus time.

Please refer to FIG. 4, which illustrates a relationship between brightness variations of the first light source 24 (curve A) and the second light source 26 (curve B) versus time according to the present invention. In the illustrative embodiment, the first light source 24 and the second light source 26 are turned on simultaneously (time $t_2$ shown in FIG. 4). The second light source 26_(curve B) is capable of quickly emitting stable light, unlike the first light source 24 (curve A), which needs 45 to 90 seconds of warm-up time. Therefore, after enabling the second light source 26, the second light source 26 can generate light, however its luminance is lower than the light that the first light source 24 generates after being heated. During the warm-up time period of the first light source 24, only the second light source 26 is used to scan the document. During this time, the first light source 24 is heated. In general, the warm-up time period of the first light source 24 needs to be about 45-90 seconds. Suppose that the warm-up time period of the first light source 24 in this illustrative embodiment is 45 seconds ($t_3$ as shown in FIG. 4), and so 45 seconds is set as a predetermined time. When the predetermined time of 45 seconds is reached, the controller 30 simultaneously enables both the first light source 24 and the second light source 26, so that both light sources 24, 26 provide document illumination. Then, the accumulated light luminance from the first light source 24 and the second light source 26 results in a more precise gray level of the reflected light detected by the photosensor 28, and a lowered exposure time. Finally, the controller 30 transforms the different detected gray levels of light into corresponding digital data, and recombines these data to generate an image file readable by a computer.

The scanning device 20 shown in FIG. 3 is a platform scanner. However, the scanning device 20 also can be a flat bed scanner, a paper fed scanner, a copier, a Fax machine, or a multi-function product (MFP). Furthermore, both the second light source 26 and the first light source 24 are installed within the scanning module 23.

Figure 5:
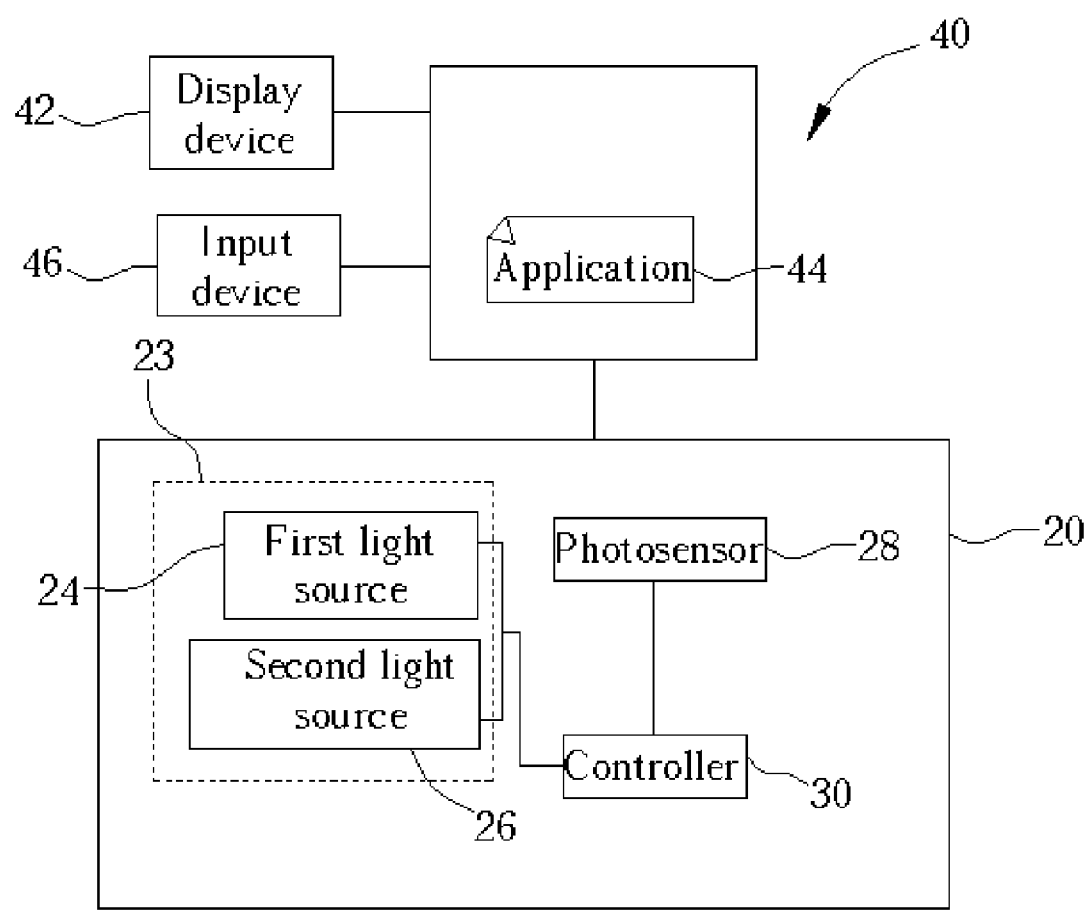
FIG. 5 illustrates a block diagram of a computer system using a scanning device according to the present invention.
Figure 6:
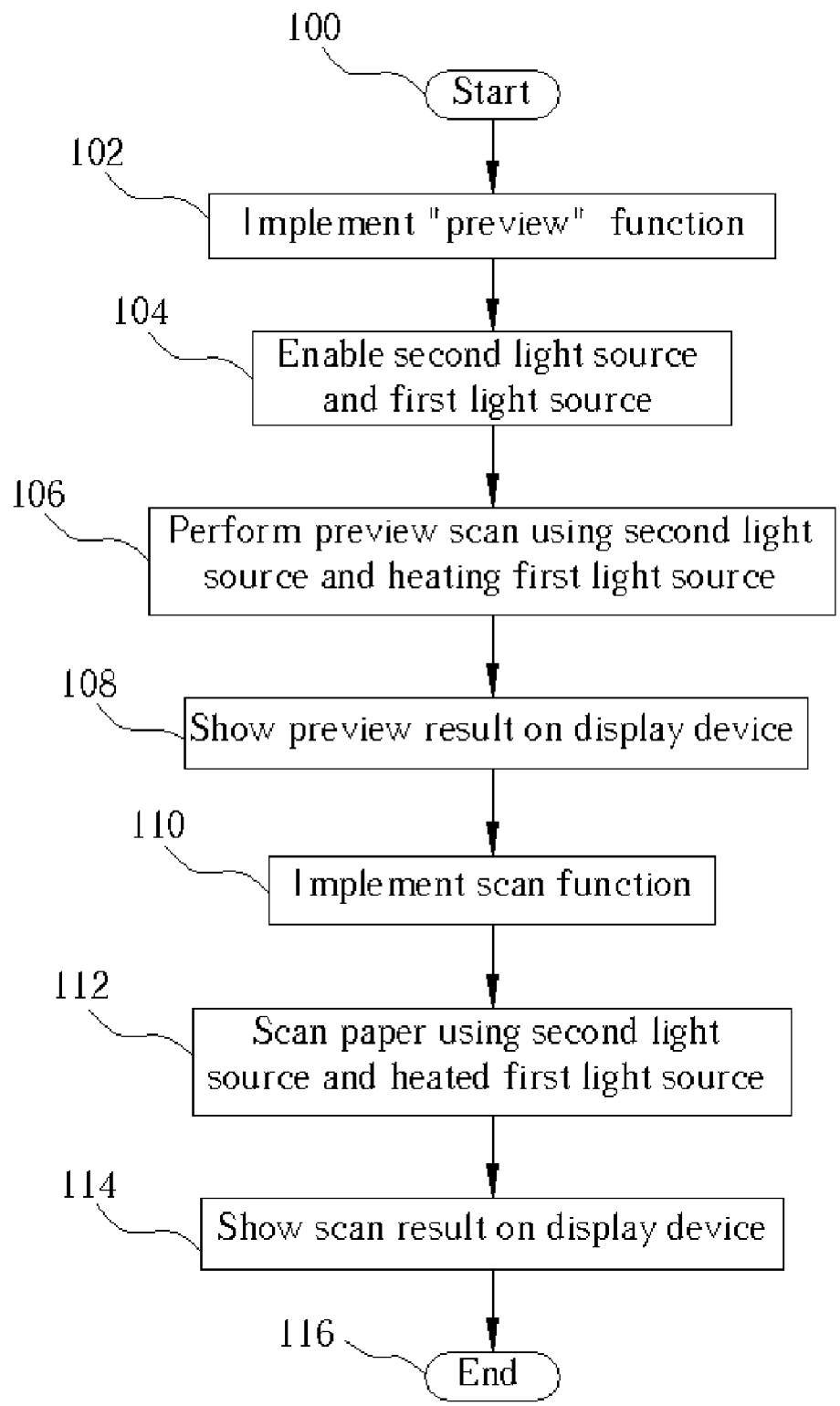
FIG. 6 is a flowchart for the block diagram of FIG. 5.

Please refer to FIG. 5, which shows a block diagram of a computer system 40 using the scanning device 20 according to the present invention. For simplicity, elements that have the same function as that illustrated in FIG. 3 are provided the same item numbers used in FIG. 5. The scanning device_20 can be a flat bed scanner or a document fed scanner. In the illustrative embodiment, the computer system 40 comprises a display device 42 for displaying images, and an image application 44, such as Photoshop published by Adobe, PhotoImpact and Photo Express published by Ulead, or OminiPage Limited Edition published by Caere. Such programs are used to initiate the operations of the scanning device 20. These applications have such functions as "preview" and "scan". How the computer system 40 cooperates with the image application 44 and the scanning device 20 is described as follows:

Please refer to FIG. 6 in conjunction to FIG. 5. FIG. 6 is a flowchart for the block diagram depicted in FIG. 5 according to the present invention. Step 100:_Start. Step 102:_Implement "preview" function.

Step 104: The scanning device 20 simultaneously enables the second light source 26 and the first light source 24. The first light source 24 begins heating.

Step 106:_Perform preview scanning using the second light source 26 and the heating first light source 24.

Step 108:_Show the preview result on the display device 42 of the computer system 40.

Step 110: Implement the "scan" function.

Step 112: Scan the document using the second light source 26 and the heated first light source 24.

Step 114:_Show the scan result on the display device 42 of the computer system 40.

Step 116:End.

Regardless of whether it involves the entire document or only a portion of the document, the user is capable of performing a "preview" function provided by the image application 44 through an input interface 46, such as a mouse or a keyboard, to verify the scanning scope of the document (step 102). Then, the computer system 40 sends a control signal to the controller 30 of the scanning device 20 to enable both the second light source 26 and the first light source 24 (step 104). Because the second light source 26 is capable of providing stable light immediately, the controller 30 can preview scan the document by using the second light source 26 in cooperation with the heating first light source 24 (step 106). The preview scan result can be shown on the display device 42 of the computer system 40 (step 108). The user may indicate which region of the document he or she desires, based on the preview scan results. By this time, the first light source 24 has warmed up. The user is capable of performing a "scan" function provided by the image application 44 through an input interface 46 to scan the desired region of the document using both the second light source 26 and the first light source 24. Finally, the scan results can be shown on the display device 42 of the computer system 40. From the above method, the heated second light source 26 and the heating first light source 24 can used for performing preview scans, providing a copious warm-up time period for the first light source 24. In this way, the user can efficiently utilize the image application software 44 cooperating with the second light source 26 and the first light source 24.

Figure 7:
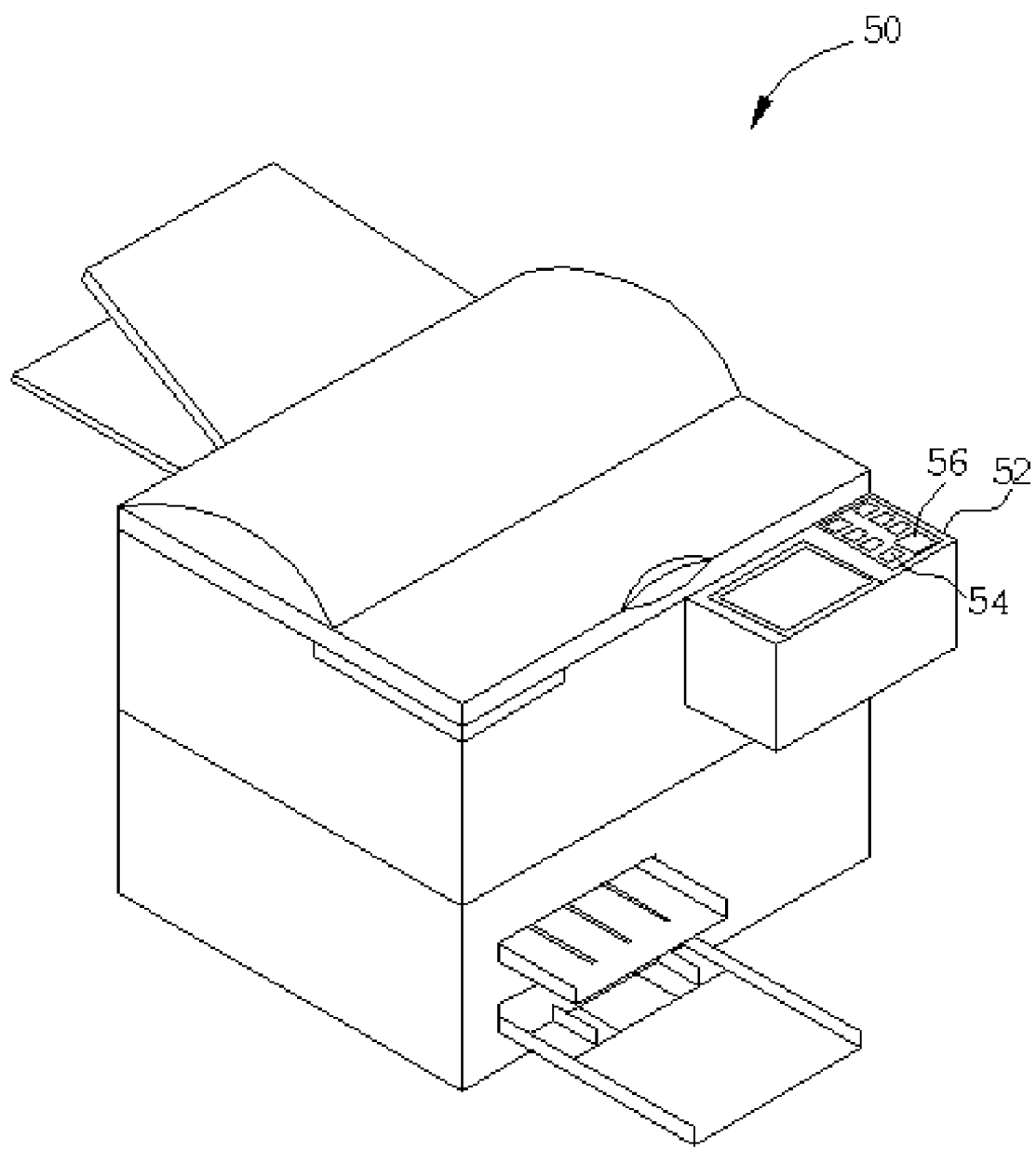
FIG. 7 is a perspective view of a multi-function product with a scanning device according to the present invention.
Figure 8:
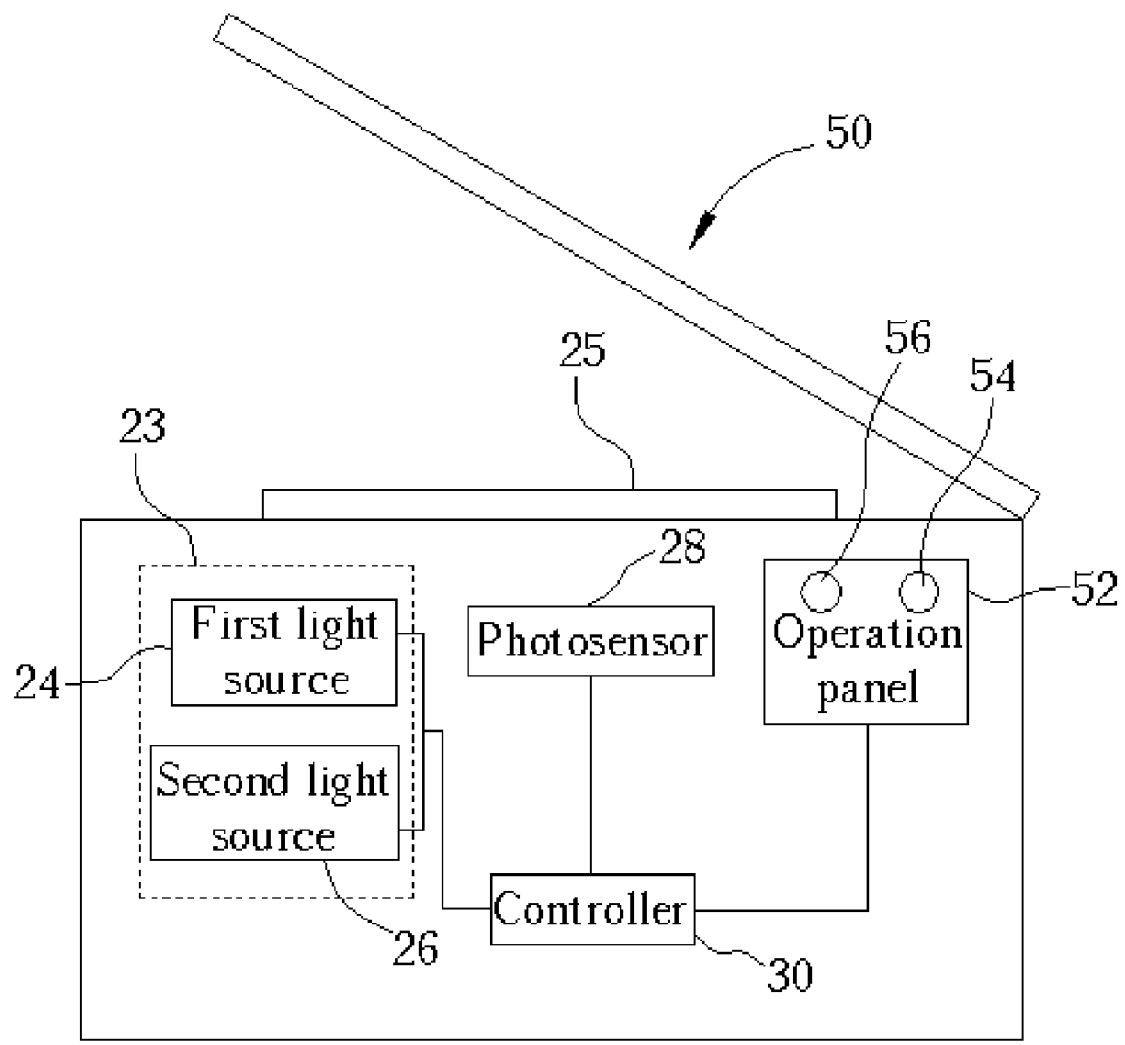
FIG. 8 is a block diagram of the multi-function product depicted in FIG. 7.

Please refer to FIG. 7 and FIG. 8. FIG. 7 is a perspective view of the multi-function product 50 with the scanning device_20 according to the present invention. FIG. 8 is a block diagram of the multi-function product 50 according to the present invention. The multi-function product 50 comprises an operations pad 52, a scanning module 23, a photosensor 28, and a controller 30. A fist light source 24, which is a CCFL, and a second light source 26, which is a white light LED, are installed within the scanning module 23. The operations pad 52 has a control button 54 and a start button 56. When the start button 56 is pressed, the controller 30 turns on the first light source 24 and the second light source 26. When the control button 54 is pressed, the controller 30 only turns on the second light source 26. For simplicity, elements that have the same function as that illustrated in FIG. 3 are provided the same item numbers used in FIG. 7.

Conventionally, the scanning module within the multi-function product requires a warm-up time period so as to heat the CCFL to a sufficient temperature. In other words, if the user only wants to copy or fax the document, he or she must wait a relatively long time due to the warm-up time period of the CCFL. However, using the present invention multi-function product 50, if the user only desires to facsimile or copy a document with a low scan quality, triggering the control button 54 to only enable the second light source 26, which is capable of generating stable light quickly, is available without waiting for the additional warm-up time period of the first light source 24. If the user desires to scan the document with a high quality scan, triggering the start button 56 to enable both the first light source 24 and the second light source 26 is needed. In this way, the user avoids waiting for the warm-up time period of the first light source 24.

In contrast to the prior art, the present invention scanning device is capable of performing a low quality scan by using the LED during the warm-up time period of the CCFL, and performing a high quality scan by using both the heated CCFL and the LED. This provides convenience for the user, who can utilize the LED to perform a low quality scan while the CCFL is being heated to avoid waiting for the warm-up time period of the CCFL.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of scanning a document with a scanning device, the scanning device comprising a first light source and a second light source for generating light, a photosensor for detecting light generated by the first light source and then by way of the document, and a controller for controlling operations of the scanning device, the method comprising:
    scanning the document using the second light source while the first light source is being heated; and
    after the first light source is heated, scanning the document using either one of the first light source and both the first light source and the second light source;
    wherein a warm-up time period of the first light source is longer than a warm-up time period of the second light source.

2. The method of claim 1 wherein the first light source is a cold cathode fluorescent lamp (CCFL).

3. The method of claim 1 wherein the second light source is a white-light light emitting diode (LED).

4. The method of claim 1 wherein the photosensor is a charge coupled device (CCD).

5. The method of claim 1 wherein the scanning device is a flat bed scanner or a paper fed scanner.

6. The method of claim 1 wherein the first light source and the second light source are installed within a scanning module of the scanning device.

7. The method of claim 1, further comprising scanning the document using both the first light source and the second light source to shorten the exposure time of the photosensor when the first light source is heated.

8. A method of scanning a document with a scanning device, the scanning device comprising a first light source and a second light source for generating light, a photosensor for detecting light generated by the first light source and the second light source then by way of the document, and a controller for controlling operations of the scanning device, the method comprising:
    performing a first scan of the document using the second light source while the first light source is being heated
    generating a first image according to the first scan;
    displaying the first image;
    following displaying of the first image, performing a second scan of the document using the first and second light source;
    generating a second image according to the second scan, the second image having greater image quality than the first image;
    wherein a warm-up time period of the first light source is longer than a warm-up time period of the second light source.

9. The method of claim 8 wherein the scanning device is a flat bed scanner or a paper fed scanner.

10. A scanning device comprising:
    a first light source for generating light;
    a second light source for generating light;
    a photosensor for detecting light generated by the first light source and the second light source by way of a document; and
    a controller for controlling the operations of the scanning device and configured to receive first and second inputs;
    wherein the controller is configured to cause only the second light source to be enabled to scan the document when the first input is received;
    wherein a warm-up time period of the first light source is longer than a warm-up time period of the second light source; and
    wherein the controller is further configured to turn on the first light source and the second light source simultaneously and utilize the first light source and the second light source to scan the document to shorten the scanning time period when the second input is received.

11. The scanning device of claim 10, wherein the scanning device includes a copier.

12. The scanning device of claim 10, wherein the scanning device is incorporated into a multifunction device including at least two of a copier, a scanner, and a facsimile.

13. The scanning device of claim 10 wherein the first light source is a cold cathode fluorescent lamp (CCFL).

14. The scanning device of claim 13 wherein the second light source is a white-light light emitting diode (LED).

15. The method of claim 10, wherein the controller includes a control button and a start button; wherein the first input comprises a control button press; and wherein the second input comprises a simultaneous control button and start button press.

16. A scanning system comprising:
    a first lighting means having a first warm-up period;
    a second lighting means having a second warm-up period longer than the first warm-up period;
    a means for sensing light from the first and second lighting means after interaction with an object; and
    a means for causing only the first lighting means to emit light at the object in response to an input;
    wherein the first lighting means is a white-light emitting diode (LED) and wherein the second lighting means is a cold cathode fluorescent lamp (CCFL).

17. The scanning system of claim 16 wherein the input is a first input, the system further comprising a means for causing both the first and second lighting means to emit light at the object in response to a second input.

18. The scanning system of claim 16 wherein the scanning system is incorporated into a multifunction device.

19. The scanning system of claim 16 wherein the multifunction device includes at least two of a scanner, a copier, and a facsimile.

20. A scanning device comprising:
    a first light source for generating light;
    a second light source for generating light and having a warm-up time that is shorter than that of the first light source;
    a photosensor for detecting light generated by the first light source and the second light source by way of a document; and
    a controller for controlling the operations of the scanning device, wherein the controller is configured to scan the document using the second light source while the first light source is warming up and to use either one of the first light source alone and both the first light source and second light source after the first light source is warmed up.

21. The scanning device of claim 20, wherein the first light source is a cold cathode fluorescent lamp (CCFL).

22. The scanning device of claim 20, wherein the second light source is a white-light light emitting diode (LED).

23. The scanning device of claim 20, wherein the scanning device is a flat bed scanner or a paper fed scanner.

24. The scanning device of claim 20, wherein the first light source and the second light source are installed within a scanning module of the scanning device.

* * * * *

UNITED STATES PATENT AND TRADEMARK OFFICE
CERTIFICATE OF CORRECTION

PATENT NO.        : 7,751,096 B2
APPLICATION NO.   : 10/604790
DATED             : July 6, 2010
INVENTOR(S)       : Kuan et al.

Page 1 of 1

It is certified that error appears in the above-identified patent and that said Letters Patent is hereby corrected as shown below:

Column 5
Line 51, delete "heated" and insert --heated;--

Signed and Sealed this

Seventh Day of September, 2010

David J. Kappos
*Director of the United States Patent and Trademark Office*